United States Patent [19]

Matheson

[11] 3,710,577
[45] Jan. 16, 1973

[54] APPARATUS FOR CONFINING A FLOATABLE LIQUID

[76] Inventor: Neil Matheson, 14 Spindrift Passage, Corte Madera, Calif. 94925

[22] Filed: Nov. 16, 1970

[21] Appl. No.: 89,818

[52] U.S. Cl. ..................................61/1 F, 61/5
[51] Int. Cl. ...........................................E02b 15/04
[58] Field of Search............61/1 F, 5; 114/.5 T, 53; 210/242, DIG. 21

[56] References Cited

UNITED STATES PATENTS

| 3,428,978 | 2/1969 | Johnson | 61/1 X |
|---|---|---|---|
| 3,590,584 | 7/1971 | Fitzgerald et al. | 61/1 |
| 3,499,291 | 3/1970 | Mikkelsen | 61/1 |
| 3,512,493 | 5/1970 | Hallanger | 114/53 |
| 3,476,246 | 11/1969 | Dahan | 210/242 X |
| 3,567,019 | 3/1971 | Headrick | 210/242 X |
| 3,613,377 | 10/1971 | Zaugg | 61/1 F |

FOREIGN PATENTS OR APPLICATIONS

| 945,091 | 12/1963 | Great Britain | 61/1 |
|---|---|---|---|
| 60,964 | 3/1968 | Germany | 61/1 |
| 1,528,855 | 5/1968 | France | 61/1 |

Primary Examiner—David J. Williamowsky
Assistant Examiner—David H. Corbin
Attorney—Eckhoff & Hoppe

[57] ABSTRACT

In apparatus for collecting and/or retaining a floatable liquid such as oil on the surface of a body of water, an improved barrier section comprising a pair of inflatable tubes, one tube being connected intermediate a depending curtain wall and the other tube, said one tube having a smaller cross section than said other tube but sufficient buoyancy for supporting both the curtain and other tube at positions below and above the surface of the water, respectively; whereby the one tube serves as a keel, pivotal rotation of said one tube bringing said other tube into floating relation with the surface of the body of water and changing the center of buoyancy to develop corrective forces that maintain the barrier section in an upright stable position.

In apparatus for collecting and retaining a floatable liquid such as oil on the surface of a body of water, a towing assembly for a floatable barrier, said assembly comprising a pair of outboard buoyancy tanks and a towing bridle that stabilize the floatable barrier and inhibit yaw, pitch and roll.

6 Claims, 9 Drawing Figures

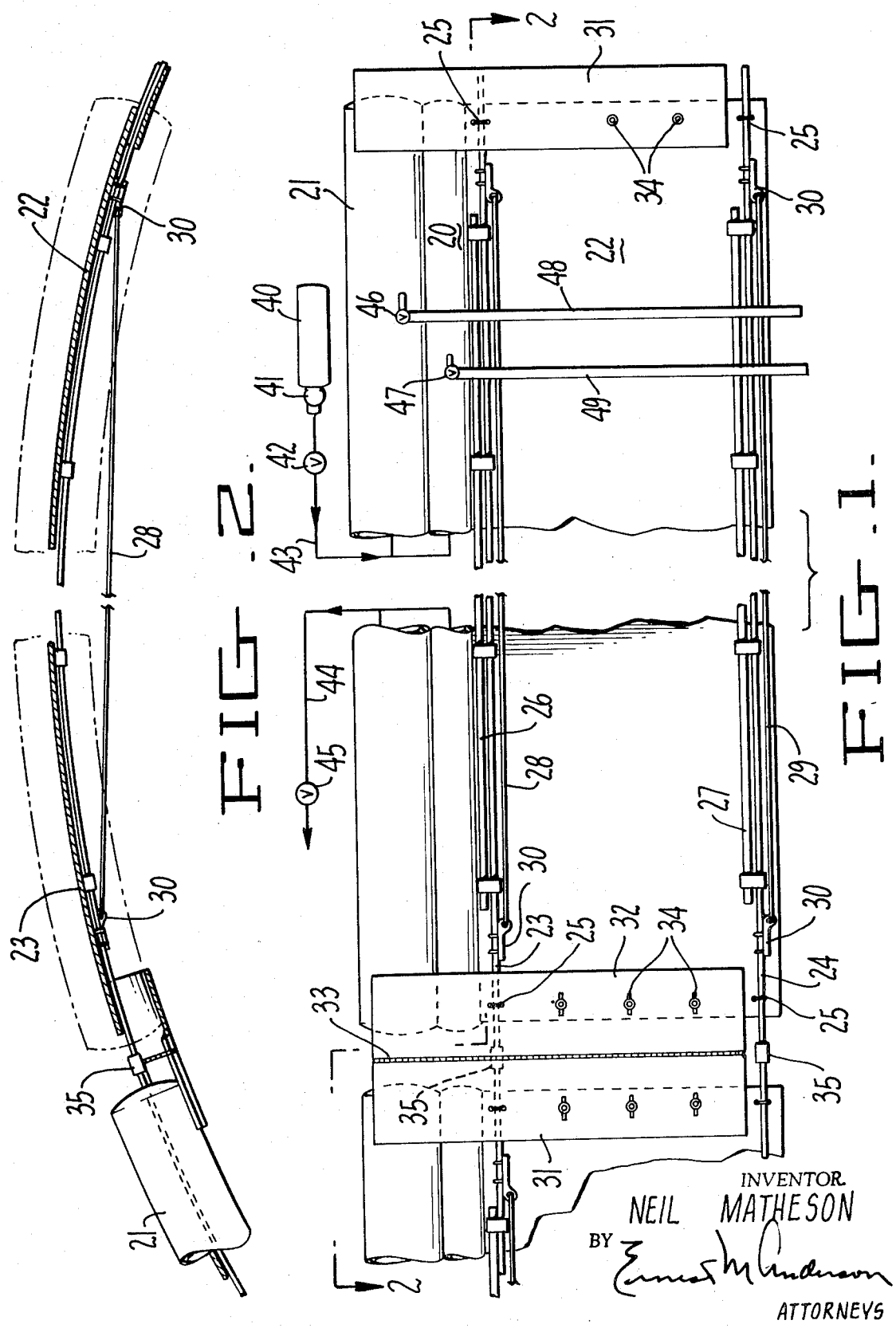

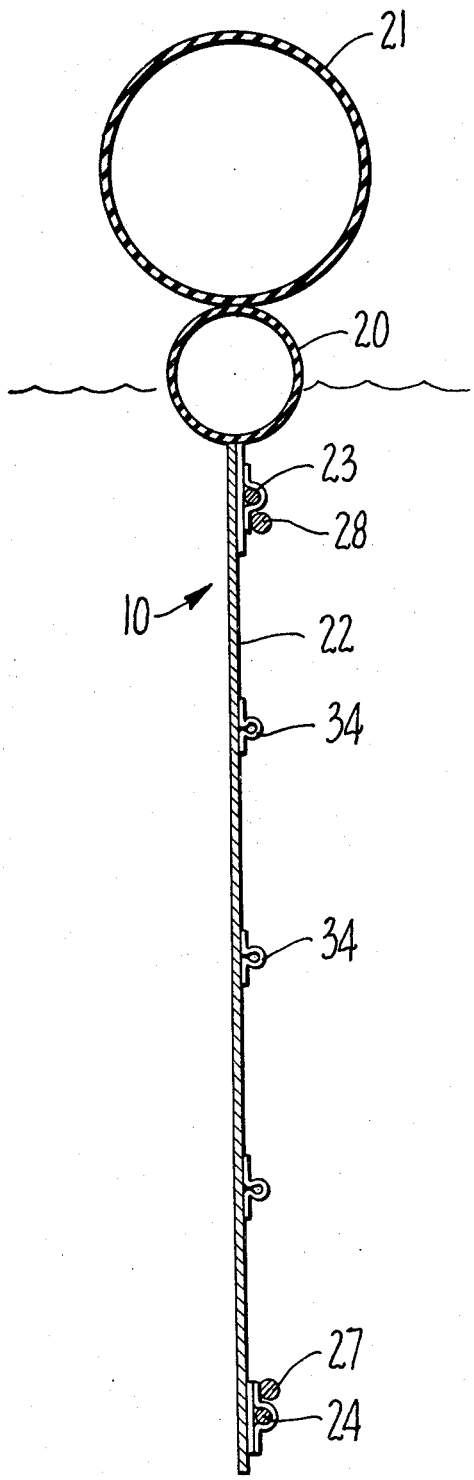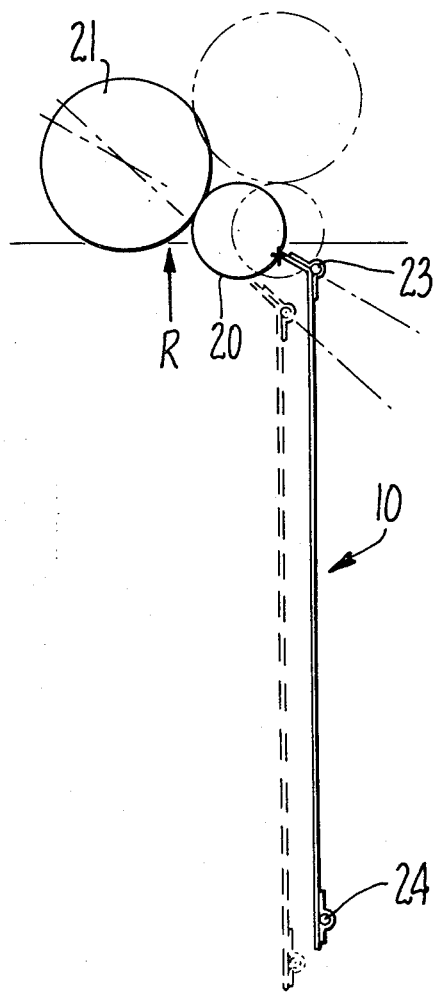
FIG. 3.
FIG. 4.

INVENTOR
NEIL MATHESON
BY Ernest M. Anderson
ATTORNEYS

APPARATUS FOR CONFINING A FLOATABLE LIQUID

This invention relates generally to apparatus for collecting and/or retaining a floatable liquid such as oil on the surface of a body of water. The invention has particular application to the recovery and/or retention of oil, as for example, which may seep from fissures during underwater drilling operations.

The problem to which this invention is directed is, generally, to provide a suitable barrier construction that may be used on large bodies of water to collect and retain oil that floats on the surface. Although considerable thought has been given to this problem, and numerous barrier constructions are known, few barrier constructions may be used in tidal water because of their tendency to break up under forces of the high seas. Furthermore, many of the known barrier constructions are so bulky or heavy that they are impractical or too costly for most operations.

The present invention, it is believed, provides a novel approach to the construction of a relatively lightweight floatable barrier and towing assembly that allows the same to be used in tidal waters.

In particular, one object of the present invention is to provide a floatable barrier having a pair of buoyancy tubes for supporting a water impervious curtain, the arrangement and size of the tubes developing a buoyancy effect that tends to maintain the curtain in an upright, stable position.

Another object is to provide an apparatus of the kind described and including floatable barrier sections which may be submerged during rough weather or turbulent seas and later raised to a floating barrier for retaining liquid on the surface of the water.

It is another object of this invention to provide a towing assembly for moving a floatable barrier through the water with a minimum of pitch, roll and yaw.

Other objects of this invention will become apparent in view of the following detailed description and the accompanying drawings.

In the drawings forming a part of this application and in which like parts are identified by like reference numerals throughout the same, FIG. 1 is an elevation of a preferred construction for a floatable barrier section as contemplated by this invention;

FIG. 2 is a plan view and section of the floatable barrier section taken on the broken lines 2—2 of FIG. 1;

FIG. 3 is an enlarged vertical transverse section of the barrier illustrated in FIGS. 1 and 2;

FIG. 4 illustrates the principles of floatation and the buoyancy effects produced with the inflatable tubes under adverse weather conditions;

Figure 5:
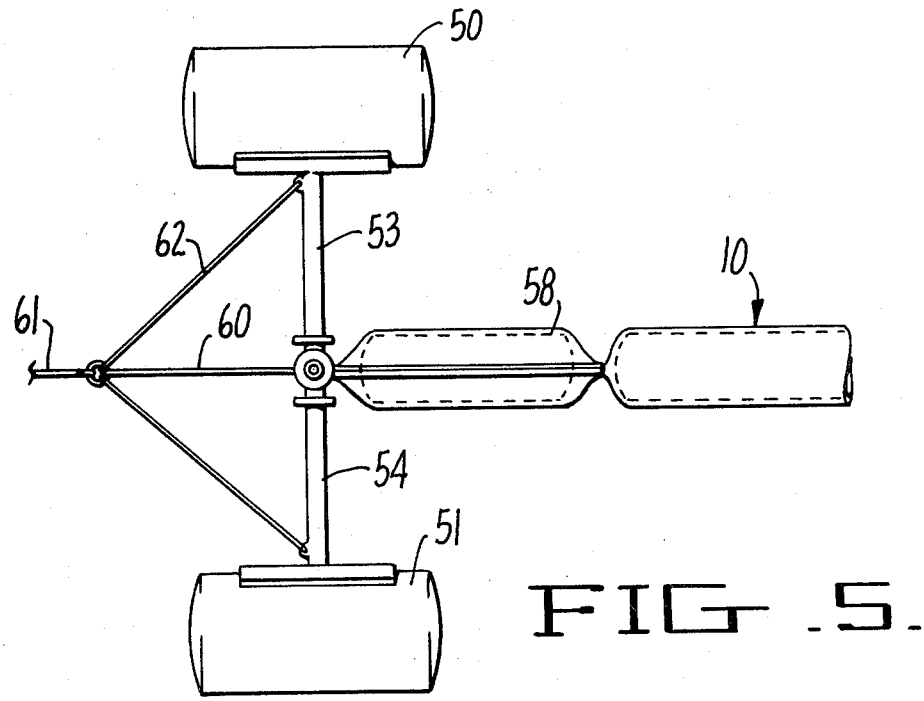
FIG. 5 is a plan view of a preferred form of towing assembly utilized in connection with this invention.

Referring to FIG. 1 in particular, there is illustrated a preferred embodiment of the present invention in a floatable barrier section 10 comprising a pair of inflatable tubes 20 and 21 and a water impervious curtain 22. Tube 20, it will be noted, is substantially smaller in cross section than tube 21 but under ordinary inflation the size of tube 20 provides the necessary buoyancy for supporting the entire barrier section including tube 21, as illustrated in FIG. 3.

Each barrier section 10 is adapted to be connected to other barrier sections and to be towed by means of a pair of towing lines 23 and 24. These lines extend along the top and bottom edges of curtain 22, a plurality of grommets 25 being employed for connecting the curtain to the tow lines.

Curtains 22 are also formed or provided with a pair of flexible though relatively stiff rods 26 and 27. These rods are preferably clamped to towing lines 23 and 24 and serve to prevent collapse of the curtain when the barrier section is submerged as is hereinafter described. Rods 26 and 27 possess sufficient resiliency to allow bowing of the curtain by means of a pair of upper and lower chord lines 28 and 29, illustrated in FIG. 4. A pair of thimble eyes 30 secured near the ends of each towing line 23 and 24 provide means for selectively connecting or disconnecting cord lines 28 and 29, the use of which are described herein in connection with a continuous floatable barrier made with a plurality of barrier sections.

Barrier sections 10 further comprise a pair of aprons 31 and 32 disposed at opposite ends of each curtain 22. The lateral edges of aprons 31 and 32 complement each other with portions of a zipper that allow a pair of aprons to be zipped together to form a relatively watertight seam 33. Aprons 31 and 32 may be attached to curtains 22 by means of grommets 34 and are preferably cemented or thermally joined to inflatable tubes 20 and 21.

Suitable connecting means such as cable clamps 35 are provided for joining towing lines 23 and 24 to the complementary tow lines of adjacent barrier sections.

Tubes 20 and 21 may be inflated and pressurized by means of a source of air pressure, such as air tank 40 having a pressure regulator 41. The source of air pressure is selectively applied into the inflatable tubes through a control valve 42 and a pressure line 43. It is contemplated that the pressure line 43 may be imbedded in the curtain 22 at the time of its manufacture and that suitable line connections be provided for joining the air pressure line of one curtain with the air pressure line of adjacent curtains. It is further contemplated that more than one pressure line may be employed for each curtain in the event that different air pressures are desired for tubes 20 and 21. However, for purposes of this invention, it is sufficient that means be provided, as shown, for selectively introducing a gaseous mixture into each of the tubes 20 and 21 to inflate and maintain inflation of the tubes. For this purpose, a separate air tank may be used for each barrier section 10.

Means is also provided for exhausting or releasing air from tubes 20 and 21 to allow the barrier to become submerged. As shown, this means comprises an exhaust line 44 that connects each tube 20 and 21 to a control valve 45. If desired, of course, separate exhaust lines may be provided for each tube, and the same control valve 45 may be used for releasing the air from tubes of a plurality of barrier sections.

The present invention further contemplates providing safety controls to avoid overinflation of tubes 20 and 21. In that connection, it is to be understood that rapid changes in ambient thermal conditions may create exceptionally high internal pressures sufficient to rupture the tubes. Similarly, a malfunction in valve 42 of pressure line 43 may also cause overinflation of the tubes.

The safety controls of the present invention comprise a pair of one-way air discharge valves 46 and 47 that close on external pressure. Valves 46 and 47 connect to hydrostatic pressure lines 48 and 49, the depth of each line determining the reference or control pressure which must be overcome to allow air to be discharged from the associate tube 20 or 21. Thus, if the pressure within either tube 20 or 21 becomes excessive, air within such tube or tubes will be bled out through the associated valve and pressure line. However, in the event that the air pressure within either tube 20 or 21 is lowered to an extent that the hydrostatic pressure within lines 48 and 49 exceeds the internal pressure of the associated tube, the air discharge valve connected thereto will close, thereby preventing the taking in of sea water.

Referring to FIGS. 3 and 4, barrier sections 10 are normally supported by the buoyancy of inflatable tube 20, and tube 21 may be supported entirely or substantially above the surface of the water. This condition of buoyancy changes, however, under extreme winds which blow against the exposed surface of tube 21. In such event, tubes 20 and 21 will roll over until tube 21 comes into contact with the surface of the water, thereby changing the center of buoyancy of the combined buoyant masses of tubes 20 and 21 and producing a resultant buoyancy force R as shown in FIG. 4. Thus, although the curtain 22 may be slightly lifted, as shown in FIG. 4, the change in location and size of the effective buoyancy mass tends to reestablish the normal floatation of the barrier section.

Figure 6:
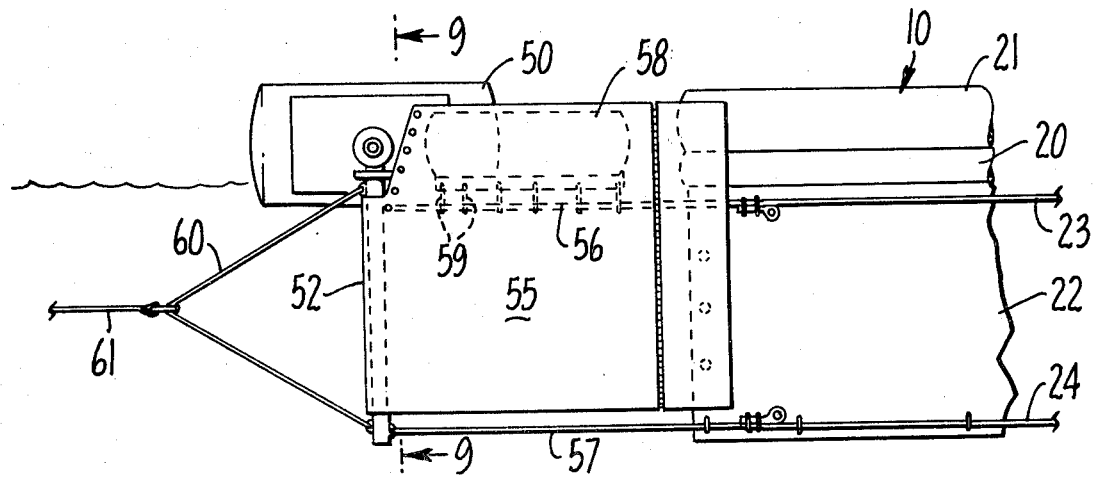
FIG. 6 is an elevation of the towing assembly illustrated in FIG. 5.
Figure 7:
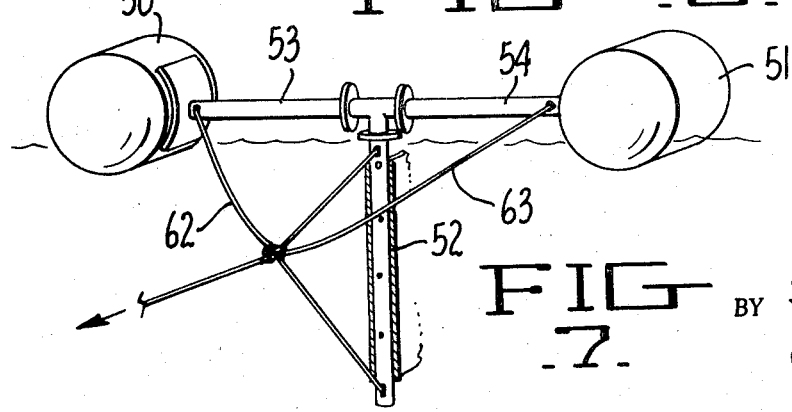
FIG. 7 is a perspective of the towing assembly as viewed from the front end thereof.

Referring to FIGS. 5, 6 and 7, there is illustrated a novel towing assembly for eliminating much of the roll, pitch and yaw commonly encountered in towing floatable barriers. In particular, the towing assembly comprises a pair of float tanks 50 and 51 connected outboard of a vertical support 52 by a pair of arms 53 and 54. Vertical support 52 connects with a lead barrier section 10 by means of a skirt 55 and tow lines 56 and 57. A float tube 58 in the upper end of skirt 55 maintains the skirt and tow lines 56 in substantial alignment with the end of lead barrier section 10, a plurality of ties 59 connecting tow line 56 to float tube 58.

The towing assembly further comprises a bridle 60 that connects a towing cable 61 to upper and lower portions of vertical support 52. In addition, a pair of yaw stabilizing lines 62 and 63 connect the towing cable to arms 53 and 54 at points outboard and on opposite sides of vertical support 52. Under normal conditions, stabilizing lines 62 and 63 contain some slack and do not take up the thrust of towing. It is only when the towing assembly tends to yaw to the right or left that the cables 62 and 63 come into play, restricting the angle to which vertical support 52 may be pivoted relative to the direction of towing.

Figure 8:
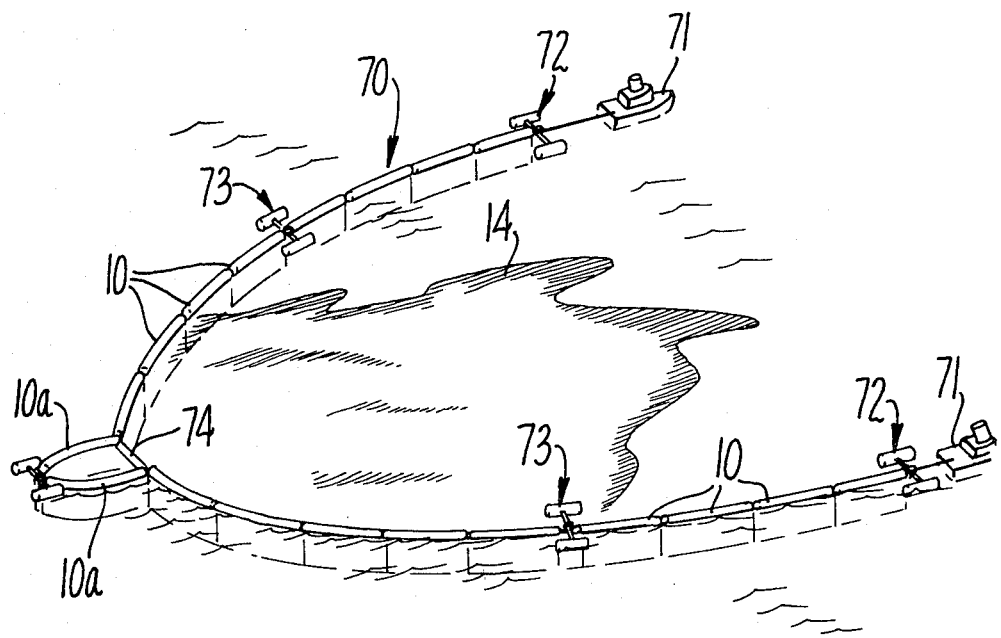
FIG. 8 illustrates a preferred application of this invention in collecting and retaining oil that floats on the surface of a large body of water.
Figure 9:
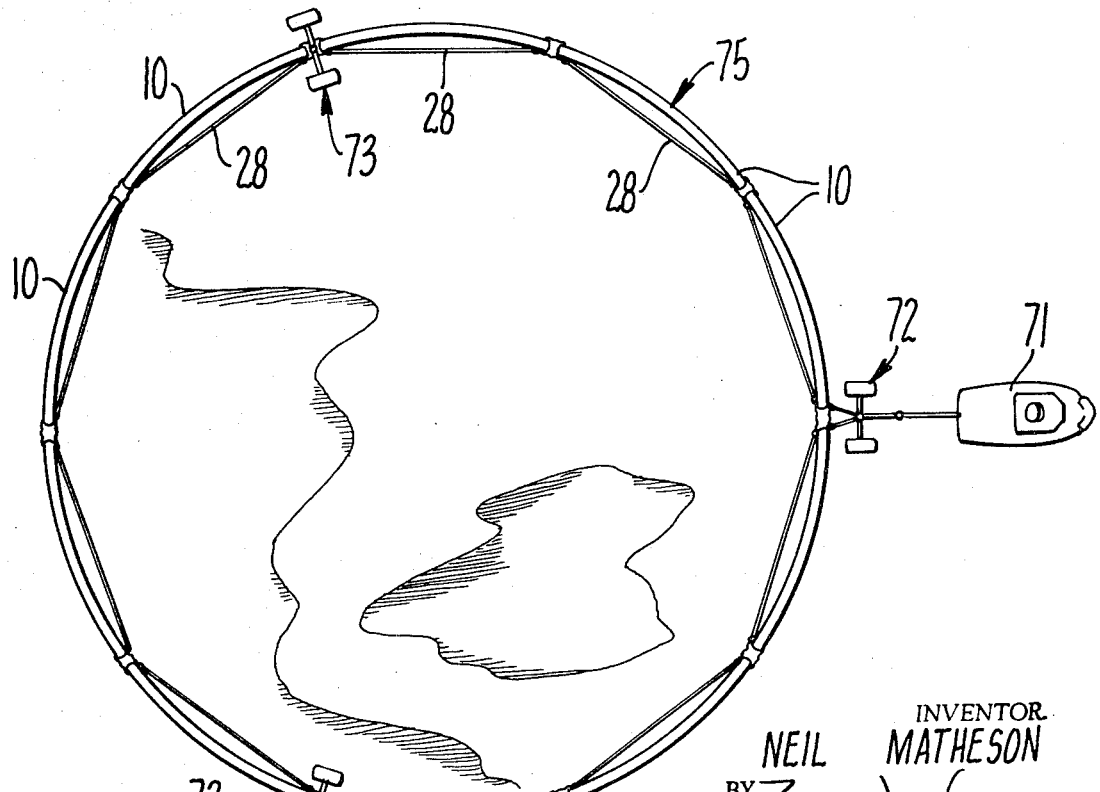
FIG. 9 illustrates a second application of the invention in providing a continuous barrier into which a floatable liquid such as oil may be dumped and then transported to a recovery area.

Buoyancy tanks 50 and 51 provide the essential forces required to counteract any tendency there may be for the barrier sections to roll. This is of particular importance with respect to the lead barrier section but similar devices may also be employed intermediate other barrier sections of the floatable barrier assembly, as shown in FIGS. 8 and 9. Importantly, the use of buoyancy tanks 50 and 51 are a major factor that allows barrier sections 10 to be towed without providing a large amount of weight in the lower portion of curtains 22. It is only by resorting to such weight that many conventional floatable barriers are functional, and without such, those same barrier sections roll over upon themselves much the same as a ribbon trailing in the wind.

Referring to FIG. 8, there is shown one application of the present invention in a floatable barrier 70 comprised of a plurality of barrier sections 10 joined end to end and drawn through the water by a pair of tugs 71. Towing assemblies 72, constructed as described in connection with FIGS. 5, 6 and 7, maintain the floatable barrier in a relatively upright and stable position during the towing operation, and several pairs of lateral stabilizing units 73 are employed between barrier sections as needed to counteract any wind or water currents which might produce roll. Each unit 73 is constructed essentially the same as tanks 50 and 51, being supported outboard from a vertical support 52 that connects with both tow lines 23 and 24 of the two barrier sections between which it is employed.

A pair of barrier sections 10a in the most rearward section of the barrier are joined together by a line 74 as to form a pocket within which the oil slick is compacted. The forward movement of the tug 71 and barrier 70 will compact the oil within the pocket to a depth of several inches, and the oil within the pocket may then be pumped into the hold of a tanker or some other storage reservoir, not shown.

It will be readily seen that any number of barrier sections 10 may be connected to enclose or partially enclose a floating oil slick, although practical limitations are imposed by the strength of the towing cable and towing lines which must bear the accumulated strain for moving the barrier through the water. Importantly, only lateral strains are placed on tubes 20 and 21 and skirts 22, and those strains do not cumulate.

Inasmuch as the towing force is applied to the upper and lower towing lines 23 and 24 equally, curtains 22 are maintained in a substantially straight line and extend to a uniform depth from the surface of floatation. Towing assemblies 72 also serve to prevent uncontrolled undulations or curling near the lower edge of the curtain and eliminate or reduce pitching of the barrier as it is riding in the seaway.

Any tendency for the barrier to roll around its center of gravity is offset and countered by the buoyancy effect of stabilizing units 73. This effectively eliminates the need for underwater weights which unnecessarily increase drag and the size of towing lines which would otherwise be needed to move conventional barriers through the water.

FIG. 9 illustrates an application of barrier sections 10 joined end to end to form a continuous barrier 75. Such a barrier may be used to enclose an area from which oil is seeping from underwater fissures or it might also be used simply as a storage container for oil. Importantly, cord lines 28 and 29 are used to form an arc from each barrier section 10, flexible rods 26 and 27 being placed under stress. Thus, both the top and the bottom of each skirt will take the form of an arc and because of the rigidity of that arc, each barrier section 10, in combination with other sections, may be anchored in place to define a relatively rigid and stable barrier. This is in contrast to most conventional barriers which acquire "rigidity" (and an ability to confine a floatable liquid) only while being towed.

It is particularly contemplated that the configuration and construction of barrier 75 may be used to lighten the oil cargo from a stranded or disabled vessel even under adverse sea conditions. In the case of a stranded vessel, where it may be impossible to bring a salvage barge along side, a floatable barrier such as barrier 75 may be let down or floated into the stranded vessel from a salvage vessel standing off at a safe distance. Oil may then be pumped from the stranded vessel directly into the enclosure defined by the barrier, and when the barrier has been filled with oil or to the extent to which it can retain such oil under existing conditions, the barrier may then be worked out to safer waters or to the salvage ship onto which it may be transferred. Repeated working of the continuous barrier to and from the stranded vessel will eventually lighten the load to the extent that the vessel may again be floated.

It is further apparent that under certain circumstances a vessel equipped with a barrier 75 aboard could take its own remedial action and lighter its load sufficient to free itself from an accidental grounding. For example, the crew could lighten the ship by pumping its cargo overboard into the barrier and after freeing the vessel, the oil could then be transferred back into the vessel's hold.

Various other applications are contemplated. Perhaps one of the more important uses would be in providing a circular configuration that may be employed as a permanent barrier around oil rigs on open seaways as to prevent the spread of accidental oil spills. If used for such purposes, barrier 75 would be anchored to the oil rig by suitable mooring lines connected to eyelets 30 on the upper towing cables 23. This would place all strain on the towing line rather than on the fabric materials of either inflatable tubes 20 or 21 or skirts 22. During normal or moderate weather conditions, barrier 75 would be moored in its floating position, but in the event of unusually high winds and rough seas, the air within inflatable tubes 20 and 21 would be exhausted by opening valves 45. The circular configuration of barrier 75 would nevertheless be maintained by reason of the arc configuration established by flexible rods 26 and 27 and chord lines 28 and 29. After the heavy weather conditions subsided, then tubes 20 and 21 would be reinflated to reestablish normal operating procedures.

The foregoing description of operation for submerging barrier 75 may also be used to allow a vessel to pass over the barrier and dock at the rig. For such purposes, it may be desirable to speed up the process of submerging a particular barrier section by using a vacuum pump to increase the rate at which air is exhausted from the inflatable tubes.

Although several embodiments of this invention and applications of the invention have been illustrated and described, various modifications and changes may be resorted to without departing from the spirit of the invention or the scope of the attached claims. For example, under certain severe conditions, it may be desirable to provide internal air bladders to each of the tubes 20 and 21. Also, the process of inflating tubes 20 or 21, or exhausting air therefrom, may be accomplished with valves remotely controlled or operated from a rig or vessel. Various other modifications and changes will be readily apparent to persons knowledgable in the art to which the invention relates.

What is claimed is:

1. Apparatus for retaining a floatable liquid on the surface of a body of water including a plurality of floatable barrier sections, each section comprising a flexible water impervious upright curtain; a pair of cables secured to each curtain and extending longitudinally thereof in spaced relationship one to the other, one cable being located adjacent the upper edge of said curtain, the other cable being located adjacent the bottom edge of said curtain; and a pair of first and second elongated buoyant tubes, said first tube being connected intermediate said curtain and said second tube, said first and second tubes being in generally upright vertical alignment relative to the plane of said curtain under normal conditions of floatation but positioned pivotally offset from the vertical to one side of said curtain along said one cable under adverse weather conditions, the buoyancy of said first tube being sufficient for supporting said barrier section while said second tube is positioned essentially above the surface of the water, said second tube having a substantially greater cross section than said first tube so that when said tubes are in said pivotally offset position said second tube contacts the surface of the water while the upper edge of said curtain and said one cable remain below the surface of the water; whereby a pivotal rotation of said first tube to said pivotally offset position brings said second tube into floating contact with the surface of the water to one side of said curtain, changing the center of buoyancy of the barrier and developing corrective forces that maintain the barrier in a generally upright stable position.

2. The apparatus of claim 1, each curtain having a resilient rod secured thereto adjacent the bottom edge.

3. The apparatus of claim 1, each curtain having a pair of resilient rods secured thereto adjacent the top and bottom edges, respectively.

4. The apparatus of claim 1 and further comprising means including a plurality of chord tension lines for maintaining each barrier section in an arc, one line extending between ends of each barrier section.

5. The apparatus of claim 1 and further including a lateral stabilizing unit comprising a rigid vertical support, a pair of floats connected to the upper end of said support and located on opposite sides thereof, means connecting said support with the pair of cables of at least one curtain.

6. The apparatus of claim 1, and means for selectively inflating and deflating said first and second tubes to change the buoyancy of each, comprising means for applying pressurized air to said tubes and valve means for selectively discharging air from said tubes.

* * * * *